United States Patent [19]

Fisher et al.

[11] Patent Number: 4,883,083
[45] Date of Patent: Nov. 28, 1989

[54] RELIEF VALVE ASSEMBLY; PISTON MEMBER FROM SAME AND FILTER HEAD ASSEMBLY INCORPORATING SAME

[75] Inventors: Patrick Fisher; Jack Stifelman, both of Bloomington; John F. Connelly, Minnetonka; Jeff J. Theisen, Prior Lake, all of Minn.; Patrick Fisher, Blooomington, all of Minn.

[73] Assignee: Donaldson Company, Inc., Minneapolis, Minn.

[21] Appl. No.: 292,644

[22] Filed: Dec. 29, 1988

Related U.S. Application Data

[63] Continuation of Ser. No. 46,903, May 5, 1987, abandoned.

[51] Int. Cl.[4] .............................................. B01D 29/36
[52] U.S. Cl. .................... 137/110; 137/538; 210/133
[58] Field of Search ............... 137/110, 503, 538, 540; 210/133

[56] References Cited

U.S. PATENT DOCUMENTS

| | | | |
|---|---|---|---|
| 2,646,886 | 7/1953 | Le Clair | 210/133 |
| 3,040,894 | 6/1962 | Pall | 210/133 |
| 3,080,885 | 3/1963 | Webster et al. | 137/538 X |
| 3,246,760 | 4/1966 | Keel | 210/133 |
| 3,303,831 | 2/1967 | Sherman | 137/538 X |
| 3,490,593 | 1/1970 | Pohoski | 137/110 X |
| 4,161,189 | 7/1979 | Mueller, Jr. | 137/538 X |
| 4,268,384 | 5/1981 | Rosaen et al. | 210/133 |
| 4,316,801 | 2/1982 | Cooper | 210/133 X |
| 4,615,800 | 10/1986 | Stifelman et al. | 210/133 X |

Primary Examiner—John Rivell
Attorney, Agent, or Firm—Merchant, Gould, Smith, Edell, Welter & Schmidt

[57] ABSTRACT

A filter head assembly includes a relief valve assembly therein, and is adapted for use in a spin-on filter or the like. When the relief valve assembly is in a closed mode of operation, fluid flow through the filter head, and an associated filter, results in conventional filtration. When the relief valve assembly is in open mode of operation, the filter is substantially bypassed permitting fluid to flow directly through the filter head, with filtration. The relief valve assembly includes a movable piston member therein, which opens and closes for the respective flow passage outwardly from a lateral takeoff port. Any substantial, undesirable, lateral forces acting upon a piston member may be substantially reduced by means of a lateral pressure release system provided according to the present invention. Generally, the lateral pressure-relief system comprises an annular recess formed in the piston member. The preferred piston member is cup-shaped and has an outer sidewall slide portion which forms a slip fit with a valve body relief valve. The preferred slide member includes groove means therein, facilitating movement. Also, preferably, a first end of the piston member includes an annular portion thereon providing an extension of a first end of the piston member to increase surface area against which fluid pressure may act.

17 Claims, 3 Drawing Sheets

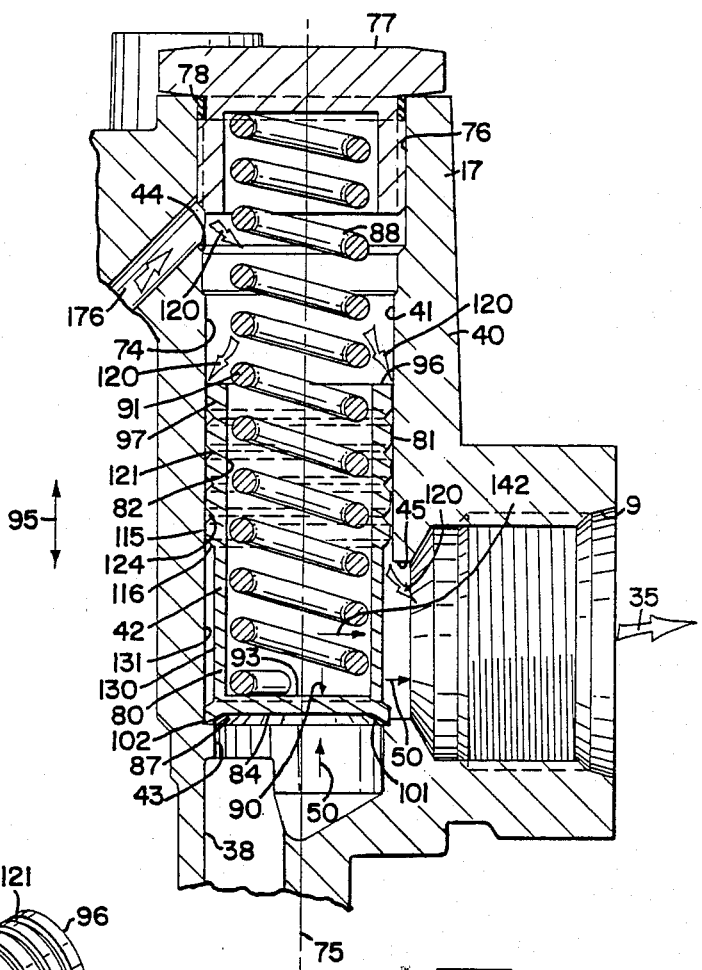
FIG. 5
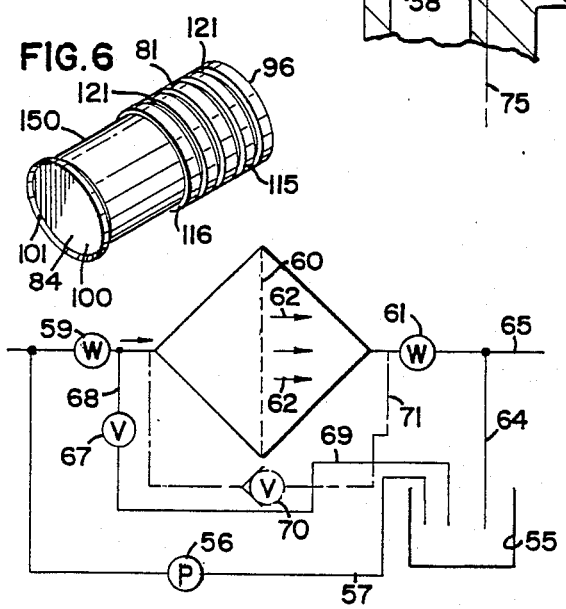
FIG. 6
FIG. 8
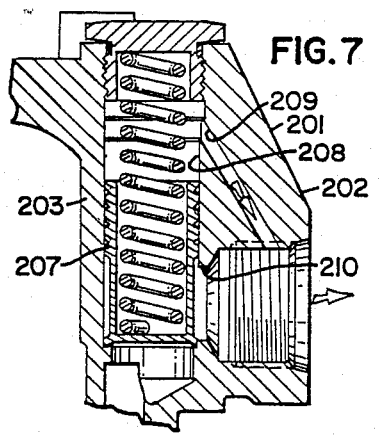
FIG. 7

RELIEF VALVE ASSEMBLY; PISTON MEMBER FROM SAME AND FILTER HEAD ASSEMBLY INCORPORATING SAME

This is a continuation of application Ser. No. 046,903 filed May 5, 1987 now abandoned.

TECHNICAL FIELD

The present invention relates generally to filter heads and valve assemblies for use with fluid filters. Specifically, the invention concerns bypass valves for such systems. The preferred embodiment concerns filter heads adapted for use with spin-on filters wherein the filter head includes a relief or bypass valve assembly.

BACKGROUND OF THE INVENTION

Fluid filters are commonly used in a variety of applications, including hydraulic systems, fuel systems and lubrication systems. Such filters generally include a filter element enclosed within a housing and mounted on a filter head. The filter head is usually incorporated into a fluid line of the slow system. Thus, the fluid head generally includes an inlet port, whereby fluid flow is received and directed into the filter or filter assembly. The filter head also generally includes outlet means by which fluid is received from the filter assembly, following filtration, and is directed back into a fluid flow-line.

Frequently used filter or filter assemblies are of the spin-on type, such as the one described in U.S. Pat. No. 4,369,113, incorporated herein by reference. The filter head assembly of the present invention is particularly adapted for use with such spin-on filters; however the principles may be employed with other types of filter systems.

Generally, such filter assemblies provide for the removal of undesired particles from a fluid line. Eventually, the filter elements of such assemblies may become clogged, prohibiting substantial fluid flow across the filter element. When such condition occurs, pressure on the upstream side of the filter assembly, relative to the downstream side, may become substantial. Also, the volume of fluid flow from the outlet end would become reduced and quite possibly could be entirely stopped.

The above type of blockages in fluid flow lines can pose numerous problems. For example, should fluid flow outward from the filter head at an appropriate rate substantially stop, then machinery located downstream may become damaged. Further, the increased pressure on the upstream side of the filter may result in rupturing of fluid seals, or damage to machinery located upstream of the filter. Also, should the upstream pressure become great enough, the filter itself may rupture or collapse, possibly resulting in a release of undesired matter from the filter, which can damage downstream equipment or occlude fluid lines.

To alleviate some of the above-described problems, a filter system may include a bypass line, operated by means of a relief valve, to permit fluid flow to selectively circumvent the filter in response to substantial occluding or plugging of the filter assembly. While numerous arrangements are possible, generally such bypass lines are of two basic types. In the first, when substantial plugging of the filter occurs, the relief valve permits fluid flow to merely circumvent the filter, and lead back into the main fluid line. For this type of arrangement, the fluid flowing into the downstream machinery will not have been filtered; however, at least downstream machinery will be protected from loss of substantial fluid pressure.

For the other type of arrangement, generally the relief valve operates to permit fluid flow into a line which is directed back to a fluid reservoir or elsewhere. While downstream equipment may not be protected under such circumstances, at least the filter assembly and any upstream equipment are protected from substantial increases in pressure. Also, such an arrangement may be useful when downstream machinery can tolerate a reduction in fluid flow, but not unfiltered fluid.

Conventional relief valves may be of numerous types. For example, a differential valve may be used to sense the pressure differential between the upstream and downstream sides of the filter. Should the pressure of the upstream side relative to the downstream side become sufficiently great, such a valve would open, permitting a circumventing flow of either of the two types described above. This type of valve generally includes a valve member therein which receives upstream and downstream pressure against opposite ends or sides thereof. Should the pressure of the upstream side increase relative to the downstream side, such a valve member will move within the valve body, generally opening a flow passageway for fluid to escape through an auxiliary or outlet line.

Generally, for conventional arrangements, the valve body defines a longitudinal chamber in which the piston member is slidably retained. The longitudinal chamber has a first end in communication with an upstream side of the filter assembly, and a second end in communication with the downstream side of the filter assembly. The valve member, again, is positioned between the two inlet ends of the valve chamber, and is slidable therebetween.

Also, such valve assemblies generally include a seal means providing selected sealing or seating of the piston valve member against the valve body in a manner permitting the inlet end of the valve body to be substantially sealed until pressure relief is intended. Further, such valve bodies generally include a lateral outlet aperture or takeoff aperture positioned substantially laterally with respect to the longitudinal axis of the valve body, permitting fluid flow therethrough when the relief valve is opened. As the piston member moves away from the first inlet, fluid flow through the valve body and out the lateral takeoff aperture is permitted. The fluid flow takeoff aperture is in communication with either the fluid line downstream of the filter assembly or with the fluid reservoir, depending upon which of the previously described systems is used.

The lateral takeoff aperture generally provides a lateral low-pressure area within the valve body. As will be seen from the detailed description, for conventional systems this may result in a lateral pressure differential against a side of the valve member and within the valve body. Should this occur, the valve member may tend to be pressed against a side of the longitudinal chamber, increasing friction and wear and generally disrupting smooth movement of the valve member and proper operation of the relief valve. This can become a particular problem when very high sensitivity to pressure differentials across a filter is desired; or, when very quick, smooth, operation of the relief valve is needed.

As indicated previously, generally the filter assembly is attached to a filter head by conventional means such as those described in U.S. Pat. No. 4,369,113. Such filter heads are preferably die-cast as a single unit, with appropriate lateral bores or holes drilled therein following the casting, to provide for attachment to a fluid line and to filter means. It would be preferred that a relief valve body be capable of being cast directly into the filter head at the time of the filter head assembly; for convenience, for reduction of expense; and for efficiency of operation without substantiated risk of leakage. However, previous filter heads have not generally provided for this, especially in arrangements wherein the valve body has means correcting for the problems described above.

The second type of relief valve generally operates more directly in response to absolute upstream fluid pressures, rather than in response to a differential between substantial upstream and downstream pressures. Such a valve generally includes an inlet and an outlet, the inlet being blocked by a valve member biased against the inlet, in sealing engagement, until an appropriate and selected upstream pressure is reached. When the pressure limit is reached, the valve member is pushed out of sealing engagement with the inlet aperture, permitting fluid flow into the valve and therethrough by means of the outlet. Generally, a spring or the like provides biasing of the valve member against the inlet aperture, until the selected pressure limit is reached.

It would also be preferred that this latter type of relief valve assembly be such as to be capable of formation by die-casting into a filter head of a typical assembly; again to facilitate manufacture and use without substantial leakage. It would be further preferred that such a type of relief valve be capable of formation in a system which may alternatively be easily used to form the first type of valve described above, at least with only relatively minor modifications. In this manner, considerable ease of manufacture of either type might be achieved at reduced cost.

Generally, what has been needed has been a relief valve assembly and filter head assembly appropriate for utilization in the modes previously described, and including means therein reducing problems from lateral fluid pressures operating against a sliding valve member. As will be seen, the instant invention includes such means, and other advantageous improvements.

OBJECTS OF THE INVENTION

Therefore, the objects of the present invention are: to provide a filter head assembly having a relief valve assembly therein; to provide such a relief valve assembly selectively capable of operation in response to differential pressures between an upstream and a downstream side of the filter head assembly; to provide such a relief valve assembly including a valve body defining a valve chamber having a longitudinal axis, with a first inlet, a second inlet, and a lateral takeoff aperture; to provide such a valve assembly including a valve piston member slidable therein in response to differential pressures between said first and second fluid inlets; to provide such a valve assembly including seal means providing sealing of the first inlet end by means of the valve piston member; to provide such a relief valve assembly wherein the valve body includes a lateral takeoff aperture substantially adjacent to and spaced from the first fluid inlet; to provide such an assembly wherein the valve piston member selectively operates to permit fluid flow from the first fluid inlet, through a portion of the valve body, and outwardly through the lateral takeoff, in response to a substantially high pressure differential between the first inlet and the second inlet of the valve body; to provide such an arrangement wherein the valve piston member is selectively adapted for sliding movement within the valve body, with a lubricating fluid layer therebetween; to provide such an assembly wherein the lubricating fluid layer is preferably provided by fluid flow from the second inlet end under pressure; to provide such an assembly including means whereby asymmetry of lateral fluid pressures applied to the valve member during use is substantially avoided; to provide such an assembly wherein the preferred valve piston member is a generally cylindrical, cup-shaped, member having an outer sidewall with a takeoff aperture overlap recess therein, providing for pressure relief with respect to lateral pressures against the valve piston member; to provide an assembly wherein the preferred valve piston member has a first end with a pressure face thereon, generally oriented for facing the first inlet of the valve body, wherein the pressure face includes an annular extension thereon, providing for sealing with the valve body and providing for an increase in the overall surface area of the pressure face; to provide a valve assembly wherein the piston member sidewall includes groove means therein facilitating lubricated motion of the valve piston member with respect to the valve body; to provide a filter head assembly which may be die-cast with the valve body substantially formed therein; to provide a piston member particularly adapted for use with such a valve body, and including lateral pressure relief means therein; to provide such a valve assembly which may be selectively adapted for use as a relief valve in substantially direct response to upstream fluid pressure; to provide a filter head arrangement which may be die-cast with a valve body therein that operates with respect to differential pressures between an upstream and a downstream side of the valve body, or which may be adapted to operate substantially directly in response to upstream pressures of the valve body; and to provide such a filter head, relief valve assembly, and piston member which are relatively inexpensive to produce, relatively easy to manufacture, relatively simple to use and assemble, and which are particularly well adapted for the proposed uses thereof.

Other objects and advantages of this invention will become apparent from the following descriptions taken in connection with the accompanying drawings, wherein are set forth by way of illustration and example certain embodiments of this invention.

SUMMARY OF THE INVENTION

A relief valve assembly is provided for permitting fluid flow to circumvent an occluded filter in a fluid line such as a lubricating line, a fuel line, or an hydraulic line. The relief valve assembly includes a valve body defining an internal longitudinal chamber having a first inlet, a second inlet, and a lateral takeoff aperture. In use, the valve body is typically oriented with the first inlet receiving fluid flow from flow-communication with an upstream side of a cooperating filter assembly; and the second fluid inlet operatively engaging a downstream side of the filter assembly. Thus, the valve body is preferably oriented for sensing differential pressures between upstream and downstream sides of the associated filter assembly.

The relief valve also includes a valve member of piston member oriented within the valve body longitudinal chamber and sized to be slidable therein. The relief valve includes means providing for sealing engagement between the piston member and the first flow inlet to seal or close same until a selected differential pressure is reached.

For the preferred embodiment, the piston member is a cylindrically-shaped cup having a bottom face, or first pressure face, generally oriented to engage and block, selectively, the first fluid inlet. The bottom face includes an annular edge seal thereon which provides for sealing engagement with the preferred fluid inlet described, and which generally increases the surface area of that portion of the piston member which is available to receive pressure from the first inlet, when the first inlet is closed.

The valve assembly also includes seal means including a biasing member or means used to maintain a sealing engagement between the valve piston member and the first inlet, until a selected pressure differential has been reached. For the preferred embodiment, the biasing member generally comprises a coiled spring which engages an interior portion of the preferred cup-shaped piston member. The coiled spring need not apply a very great force to the piston member, as the purpose of the spring is simply to keep the valve closed. The valve piston member operates in response to differential pressures which exceed the spring pressure.

In the preferred embodiment, the piston member includes an outer cylindrical sidewall devoid of having any conventional type of piston rings or seals thereon. Generally, the outer cylindrical,, sidewall includes a slide portion which is snugly received within the valve body for sliding engagement with these walls that define the internal chamber and extend between the lateral takeoff aperture and the second fluid inlet. While the preferred piston member is generally sized to very snugly engage the valve body wall, as previously described, sufficient tolerance is permitted to allow for a fluid flow from the second inlet around the slide portion of the valve member and outwardly through the lateral takeoff aperture. Preferably, the slide portion of the piston member includes annular grooves therein, reducing the possibility of substantial friction between the piston member and the valve body.

As will be better understood from the detailed description below, an arrangement such as that previously described can result in substantial pressures operating generally radially against the piston member, as a result of a fluid flow under pressure between the piston member and the valve body. Generally this pressure is radially symmetric, at least against the slide portion of the piston member, since the valve body which completely surrounds the slide member is radially symmetrical with respect thereto. However, in that portion of the valve body in which the lateral takeoff is positioned, the valve body is no longer symmetric. Thus, in the absence of lateral pressure relief means, there will tend to be a net pressure against the valve piston member pushing the same toward the lateral aperture takeoff. This condition, if not properly controlled, can result in an unsmooth operation of the piston member within the valve body, and a possible increase in wear due to increased frictional contact.

One of the major advantages of the present invention is the provision of lateral pressure relief means, as indicated above, to substantially restore radial symmetry with respect to these lateral forces. In the preferred embodiment, this is accomplished by means including providing an annular recess in the outer cylindrical wall of the piston member, in that portion of the piston member wall which generally overlaps the lateral or take-off aperture. The recess provided is sufficiently deep so that no substantial fluid pressure will be generated between that portion of the piston member and the valve body. Thus, substantial lateral pressures against the piston member will only occur in alignment with that portion of the valve body which generally completely surrounds the piston member, with substantially no resulting radial asymmetry.

To accomplish the above, the valve body is preferably cast within a filter head, at least when used with a spin-on type filter. Generally, the first inlet end of the valve body chamber is in flow communication with a first side of the filter, and the second inlet end of the valve body chamber is in flow communication with a second side of the filter. For the preferred embodiment, the first inlet is in flow communication with the upstream side.

Also, for the preferred embodiment, the valve body is generally oriented with respect to other portions of the filter head in a manner such that a die casting of the valve body directly in the filter head, at the same time as other major channels in the filter head are formed, is possible. This is generally accomplished by orienting the longitudinal axis of the valve body internal chamber substantially parallel with axes of certain other chambers within the filter head. This latter will be better understood from the detailed description.

Another aspect of the present invention is the provision of a type of valve assembly readily adaptable for use as a valve operating substantially directly in response to pressure in the upstream side of a fluid line, rather than as a valve operating in response to pressure differentials between upstream and downstream sides. This may be accomplished by providing that the second inlet is in fluid flow communication with the lateral takeoff aperture, by means detailed below, rather than with the downstream side of the filter. In a system in which the lateral outlet or takeoff aperture is in flow communication with a fluid reservoir, the pressure in the outlet aperture will be low relative to the upstream end. As a result, the differential pressure between the first and second inlets will generally be the pressure of the first inlet side; flow communication between the second inlet and the takeoff aperture providing a vent. Under such an arrangement, the piston member operates substantially directly in response to pressures on the upstream side of the filter and the valve will open when the pressure of the biasing means or spring is overcome. Such a system generally uses a spring providing a substantial force biasing the valve closed, so that the valve does not open under normal operation pressures.

The drawings constitute a part of this specification and include exemplary embodiments of the present invention, while illustrating various objects and features thereof. In some instances, material thicknesses, or the sizes of spaces, may be shown exaggerated to facilitate understanding.

BRIEF DESCRIPTION OF THE DRAWINGS

FIG. 2 being taken generally from the orientation of line 2—2, FIG. 1.

FIG. 5 comprises an enlarged, fragmentary cross-sectional view of a portion of a filter head assembly according to the present invention, generally showing a relief valve assembly of the present invention; FIG. 5 being taken generally from a cross-sectional view analogous to FIG. 4.

FIG. 6 is a perspective view of a valve piston member for use in association with a relief valve assembly according to the present invention.

FIG. 7 comprises a reduced, fragmentary cross-sectional view generally analogous to FIG. 5, but adapted for an alternate embodiment of the present invention.

FIG. 8 comprises a schematic view of a system utilizing a filter head assembly and relief valve assembly according to the present invention in cooperation with a flow system having a pump, a fluid reservoir and at least one station for work of the fluid; broken lines in FIG. 8 indicating an alternate flow pattern.

DETAILED DESCRIPTIONS OF PREFERRED AND ALTERNATE EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but rather as a basis for the claims and as a representative basis for teaching one skilled in the art to variously employ the present invention in virtually any appropriately detailed structure.

Figure 1:
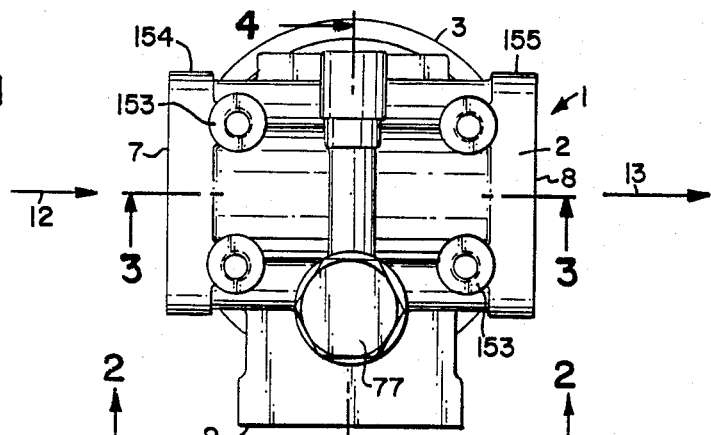
FIG. 1 is a top plan view of a filter head assembly incorporating a relief valve assembly therein, according to the present invention; the filter head assembly being shown with a spin-on type filter mounted thereon for cooperative engagement.
Figure 2:
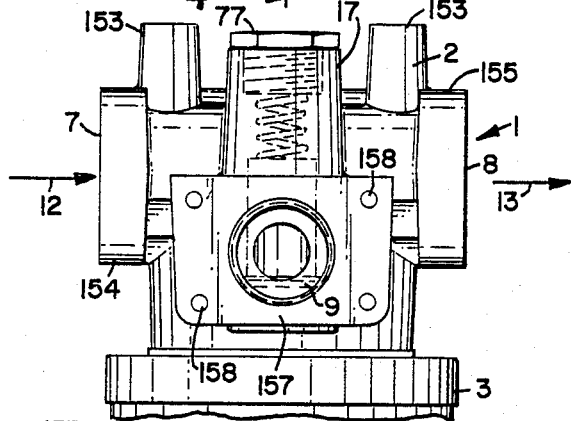
FIG. 2 is a fragmentary side elevational view of the filter head assembly according to FIG. 1, shown with a spin-on type filter attached thereto, and with certain internal portions shown in phantom lines.
Figure 3:
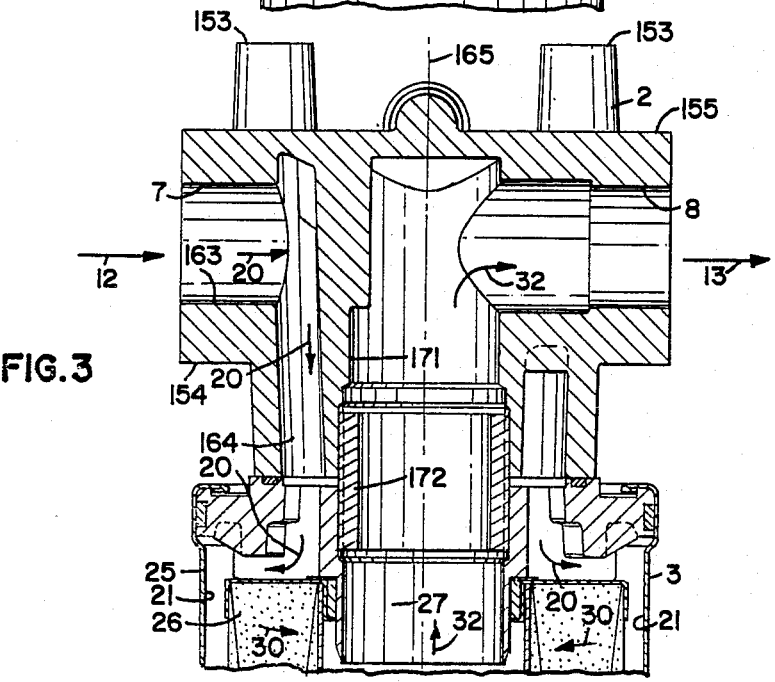
FIG. 3 comprises an enlarged, fragmentary cross-sectional view taken generally along line 3—3 of FIG. 1.

The reference numeral 1, FIG. 1, generally designates a filter head assembly according to the present invention. In FIG. 1 the filter head assembly is shown comprising a head block 2 shown with a spin-on type filter 3 mounted thereon for operation. While the instant invention is described with respect to a spin-on type filter 3, it will be understood that a variety of filter designs may be used. Referring to FIGS. 1-3, generally the head block 2 includes a main inlet port 7, a main outlet port 8, and an auxiliary or lateral takeoff port 9. In typical operation, the head block 2 will be positioned in a fluid line so as to receive fluid from the direction of arrows 12, FIGS. 1-3, directing same by conduit means described below, into filter 3. Following fluid filtration within the filter 3, conduit means directs the fluid back into the block 2, and in typical use the fluid is ejected from the head block 2 by means of the main outlet port 8, in the direction of arrows 13. Thus, but for the presence of the lateral takeoff port 9 and valve means to be described below, generally the head block 2 thus far described is a typical, conventional, T-block.

The filter head assembly 1 according to the present invention includes a relief valve assembly 17, FIG. 2, therein. The relief valve assembly 17 will be described in detail below. Generally, when the relief valve assembly or relief valve 17 is said to be "closed" the filter head assembly 1 is such that fluid flow into the main inlet port 7 is only permitted to leave the block 2 by flow through the filter 3 and outward through the main outlet port 8. Thus, the system, when the relief valve assembly 17 is closed, is oriented for normal operation in filtering fluid.

On the other hand, when the relief valve assembly 17 is said to be "open", it is generally meant that in response to substantial occlusion within the filter 3, the relief valve assembly 17 has opened, permitting fluid flow from the assembly without passage through filtering elements of the filter 3; the flow leaving the block 2 through the lateral or auxiliary outlet port 9.

The above-described general operation will be understood in more detail by reference to FIG. 3. In FIG. 3, the head block 2 is shown receiving fluid from the direction of arrow 12, into the main inlet port 7. Arrows 20 indicate general fluid flow through inlet means of the head block 2, into the filter 3, to an annular space 21. The filter 3 is of a type described in U.S. Pat. No. 4,369,113 wherein the filter 3 includes an outer side wall 25, a cylindrical filter member 26 and an internal flow passage 27, FIG. 4. As described in U.S. Pat. No. 4,369,113, such a spin-on type filter may be utilized for filtering from the inside outwardly, or the outside inwardly. For the preferred embodiment being described herein, the spin-on filter 3 is being described with respect to a normal filtration flow resulting from the outer annular space 21 into the inner core 27; however, the opposite arrangement may be utilized with appropriate modifications in the head block 2, as will be understood to those of ordinary skill in the art.

Referring again to FIGS. 3-4, following flow in the direction of arrows 20, into annular space 21, during typical operation fluid to be filtered will flow in the direction of arrows 30, through the filter 26 and into the inner chamber or core 27.

Figure 4:
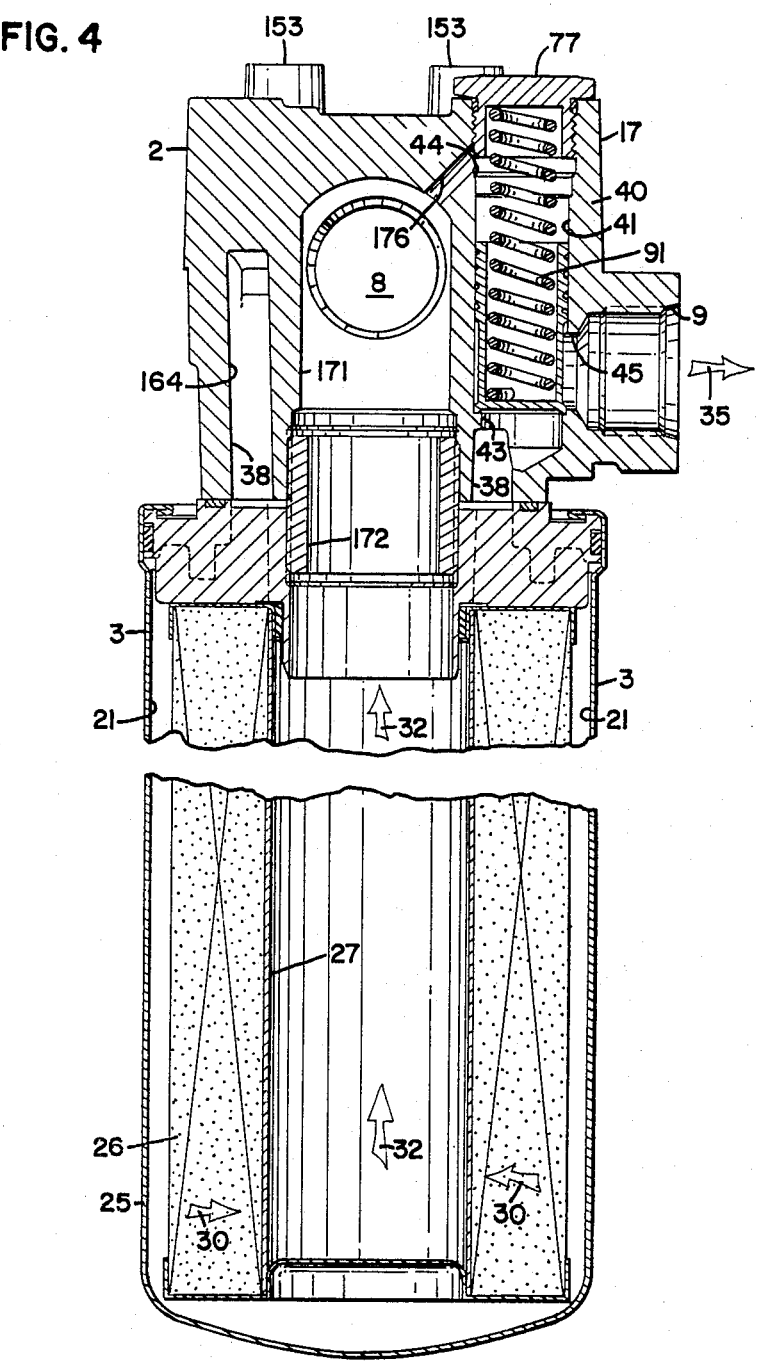
FIG. 4 comprises an enlarged, fragmentary cross-sectional view taken generally along line 4—4 of FIG. 1.

Referring to FIGS. 3-4, once having made its way to the internal chamber 27, the fluid may flow in the direction of arrows 32 outwardly through the head block 2, through flow directing means communicating with the main outlet port 8. Thus, the filter head assembly 1 may be utilized in cooperation with a spin-on type filter 3 to substantially filter fluid in almost any type of fluid line.

Should the filter 3 become substantially occluded, the head block 2 includes means enabling fluid flow bypassing the filter element 26. Referring to FIG. 4, this generally comprises flow outwardly from the head block 2 in the direction of arrow 35, through the auxiliary or lateral takeoff port 9. Generally, this is controlled by means of the relief valve assembly 17. More specifically, the head block 2 includes a channel portion 38, FIG. 4, which is in flow communication with the relief valve assembly 17. The channel portion 38 is also in direct flow communication with the inlet port 7; that is, it is not necessary for fluid to flow across and through the filter element 26 in order to make its way to channel portion 38.

Generally, the relief valve 17, FIG. 5, includes a valve body 40 defining an internal, longitudinal channel 41 having a valve or piston member 42 therein. The valve body also includes a first inlet 43, a second inlet 44 and a lateral takeoff aperture 45. The lateral takeoff aperture 45 is in flow communication with takeoff port 9. Preferably, takeoff aperture 45 is immediately adjacent first inlet 43, so that relief flow is immediately provided once the valve begins to open.

Although in FIG. 5 the valve 17 is shown closed, operation when open may be readily understood by reference thereto. In typical operation, when the relief valve assembly 17 is open the piston member is moved away from the first inlet 43, permitting fluid flow in the general direction of arrows 50, from the channel portion 38 through the first inlet 43 and outwardly from the valve body through outlet aperture 45 and takeoff port 9. On the other hand, when the valve assembly 17 is closed, the piston member 42 sealingly seats against the first inlet 43, preventing such flow. The structure and operation of the preferred relief valve assembly 17 will be described in more detail, following a general description of the filter head assembly 1 and relief valve assembly 17 for a typical fluid flow system.

FIG. 8 represents a schematic drawing showing a typical system incorporating assemblies according to the present invention. In FIG. 8, reference numeral 55 generally designates a fluid reservoir, for example of hydraulic or lubricating fluid. For typical operation, fluid is drawn from the reservoir 55 by means of pump 56, through line 57. The fluid may be used to generate work, such as to apply hydraulic pressure or to provide lubrication, at the station designated by reference numeral 59. For such an arrangement, the work will have been provided at a work station positioned on an upstream side of filter 60. In the alternative or in addition, work can be provided at work station 61, downstream of the filter 60, the direction of fluid flow into the filter 60 being generally indicated by arrows 62. Finally, the fluid may be returned to the reservoir 55 by means of line 64, to provide a complete circuit. If desired, line 65 can be used to direct the fluid to a dump or other location, avoiding a complete circuit. In this latter type of arrangement, fluid reservoir 55 might have to be repeatedly filled.

In typical operation, the filter head assembly is utilized to properly locate and mount the filter 60 within fluid line 57, to provide appropriate filtering.

In FIG. 8, a possible utilization of a relief valve assembly according to the present invention is suggested by the solid lines, with reference numeral 67 representing the relief valve. Relief valve 67 is shown generally receiving fluid flow through line 68. As long as the filter 60 is operating appropriately, the valve 67 will preferably be closed, prohibiting substantial fluid flow past the valve 67 and into line 69. On the other hand, should the filter 60 become substantially blocked, the valve 67 will preferably open, permitting fluid flow into line 69, and as shown in the Figure, into reservoir 55. Thus, the relief valve assembly 67 will have operated to prevent unfiltered fluid from reaching a downstream work station such as that indicated at reference numeral 61; or, if an upstream work station 59 is being used, the relief valve assembly will have protected the work station 59 from substantial upstream pressures. In either case, the filter 60 is protected from great pressure differentials thereacross. Of course, outlet flow from the valve 67 may be diverted elsewhere than the reservoir 55, if desired.

In some instances, such as for example when a downstream work station 61 is being used, it may be undesirable to permit fluid flow to the work station to be interrupted when the filter 60 is substantially occluded. That is, it may be more desirable to run substantially unfiltered fluid through work station 61 than it is to permit work station 61 to be without substantial fluid flow, as would occur with the above described arrangement. A scheme enabling such a result is illustrated in FIG. 8 by means of phantom lines. For the alternate, the relief valve assembly is represented by reference numeral 70. The relief valve assembly 70 is in flow communication with work station 61 by means of line 71. Thus, should valve 70 open, the filter 60 will simply be bypassed, with bypass fluid flow through line 71 going directly to work station 61.

It will be understood that a variety of applications of relief valve assemblies according to the present invention may be utilized, with the schematic of FIG. 8 generally only being representative of several typical applications.

FIG. 5 is a fragmentary cross-sectional view of that portion of the head block 2 which has the relief valve assembly 17 therein. As previously indicated, the relief valve assembly 17 comprises a valve body 40 defining an internal longitudinal channel 41. The longitudinal channel 41 is a chamber 74 and has a central longitudinal axis 75 and, for the preferred embodiment, is preferably cylindrical, with a circular cross-section. One end 76 of the chamber 74 is openable, having plug 77 threadably received therein. It is through end 76 that internal mechanisms of the relief valve assembly 17 may be inserted during assembly. Sealing engagement between the plug 77 and the remainder of the assembly is provided by O-ring 78.

The relief valve assembly 17 operates by means of selected movement of the valve piston member 42. The preferred piston member 42 is a cylindrical, cup-shaped plug 80 slidably received within the channel or chamber 41. The cup-shaped member 80 includes an outer sidewall 81, an internal bore 82 and a first pressure-receiving face 84. The first pressure-receiving face 84 receives fluid pressure, during operation of the assembly 17, directed thereagainst by means of the first fluid inlet 43 of the valve body 40. The preferred piston member 42 is shown in perspective in FIG. 6.

The first flow inlet 43 includes an annular lip 87 thereat, against which the first pressure-receiving face 84 of the piston member may seat, during sealing of the inlet, as is shown in FIG. 5. A sealing engagement is selectively provided by sealing means including biasing member 88 which, in FIG. 5, generally biases cup-shaped piston member 80 in the direction of arrow 90. The preferred biasing means of the instant embodiment comprises coiled spring 91, which operates against a second pressure receiving face 93 defined in part by the internal bore 82 of the cup-shaped member 80.

The piston member 42 is operably positioned within channel 41 between the first inlet 43 and the second inlet 44. That is, generally the piston member 42 is slidable along axis 75 in the general directions of movement indicated by double-headed arrow 95.

For the preferred embodiment of FIG. 5, the cup-shaped piston member 80 is selectively movable with respect to differential pressures between the first and second inlets 43 and 44, respectively. Preferably, piston member 80 is shaped such that the entire pressure-receiving surface area presented to fluid pressure from the first inlet 43 is substantially equal to the entire pressure-receiving area presented to the second inlet 44. Thus, should the pressure from the two inlets, per unit area, be the same, the cup-shaped piston member 80 will not move. Under such conditions, the biasing means 88 would operate to keep the valve assembly 17 closed, by seating the piston member 80 against the annular seat 87.

The surface area of the piston member 80 presented for receiving fluid pressure thereagainst from the second inlet 44, is represented by the second pressure-receiving space 93, in the internal bore 82, and also the area of annular lip 96 formed at end 97 of the cup-shaped member 80. That is, the sum of the two surface areas represented by reference numerals 93 and 96 is the total area against which fluid from inlet 44 can operatively act.

If the complete first pressure-receiving face 84 of the cup-shaped member 80 were substantially flat, then when the valve 17 is closed, the pressure-receiving surface 84 would be smaller in total surface area than the area just described, at least for a substantially cylindrical piston member 80. The reason for this is that an outer peripheral ring-shaped portion of the first pressure receiving face 84 would overlap with, and generally abut, annular seat 87, and therefore would not be available to receive fluid pressure thereagainst, at least initially when the valve assembly 17 is closed. Thus, were a completely flat head or end used as the first pressure receiving face 84, balanced inlet and outlet pressures, per square unit area, for the filter 3 would result in a net fluid force generally closing the valve assembly 17.

To substantially alleviate this problem, the first pressure-receiving face 84, of the cup-shaped member 80 according to the preferred embodiment of the present invention, is adapted in shape to increase the surface area available for receiving fluid pressure from the inlet 43. In particular, referring to FIGS. 5 and 6, end 100 of the piston member 80, which has the first pressure-receiving face 84 thereon, includes a sealing edge formed by an annular face 101 that is angled with respect to end face 84, and extends generally toward the shoulder 87. This annular face 101 terminates in a rather sharp sealing edge 102, FIG. 5, that can seat against annular shoulder 87 in a sealing manner. The face 101, being at an angle to face 84, and directed generally outwardly therefrom, increases the total surface area against which fluid pressure from inlet 43 can act. That is, it compensates for area which would otherwise have been covered up by shoulder 87. Thus, if the size and angle of the annular face 101 is appropriately chosen, the net effect will be substantially equivalent surface areas against which pressures from inlets 43 and 44 can act. As a result of edge seal 102, the hydraulic areas for sides of the piston member 80 are equivalent, leading to a balance.

In order to induce smoothness of operation and facilitate responsiveness of the cup-shaped member 80 to differential pressures, annular piston rings are generally avoided. That is, there are preferably no O-rings positioned around the outer sidewall of the piston member 42, to facilitate sealing with the valve body 40. Rather, engagement between the cup-shaped piston member 80 and the valve body 40 is preferably as follows:

Referring to FIGS. 5 and 6, the outer sidewall 81 of the cup-shaped piston member 80 includes a slide portion 115 therein. Generally, the slide portion 115 extends from lip 96 to that portion 116 of the cup-shaped piston member 80, just "above" takeoff port 9, i.e., just to the inlet 44 side of the chamber 41, from the lateral takeoff port 9. Generally, the slide portion 115 of the piston member 80 will be, in diameter, only slightly smaller than the inside diameter of the internal longitudinal channel 41. Preferably, the diameter of the slide portion 115 will be sufficiently smaller than the channel 41 to permit sliding engagement, and the formation of a very thin fluid layer, between the slide portion 115 and the valve body 40. Although a variety of tolerances may be used, typically the slide fit, or slip fit, is on the order of 0.0003 to about 0.0015 inches in tolerance.

As a result of the slip fit, fluid under pressure may flow from inlet 44 around the outside of piston member 42, between the piston member 42 and the valve body 40, until it leaks out through the outlet aperture 45. This flow is generally represented by arrows 120, FIG. 5 and the slip fit arrangement that produces it comprises a flow-directing means.

To reduce the amount of friction which can generate along the slip fit, the slide portion 115 is provided with relief means therein. For the preferred embodiment, as FIGS. 5 and 6 show, this relief means comprises groove means reducing the total surface area of the slide portion 115. For the preferred embodiment, the groove means comprises four annular grooves 121, each lying in a plane substantially perpendicular to the longitudinal axis 75. As a result of the grooves 121, free movement of the piston member 80 is facilitated.

In typical operation, the pressure at lateral outlet port 45 may be relatively low. That is, fluid escaping by means of the path indicated by arrow 35 will be under relatively low pressure when aperture 45 is reached. On the other hand, fluid in the narrow slip fit between the valve body 40 and the piston member 42 may be under substantial pressure, for example from inlet 44. Generally, for a circular piston member 42, such as cup-shaped member 80, these pressures will be radial in direction and substantially balanced, due to the receipt of cup-shaped member 80 within a cylindrical valve body 40. However, at that portion of the piston member 80 which overlaps lateral takeoff 45, radial symmetry is lost. That is, in the absence of lateral pressure relief means according to the present invention, there may be a tendency for the piston member 80 to be pressed toward the inlet aperture 45. The result of such a net pressure would be to cause the cup-shaped member 80 to begin to deviate from simple longitudinal movement along the direction of arrows 95. This could result in undesired friction developing within the valve assembly 17 and a lack of smooth operation of the piston member in response to selected differential pressures.

Referring again to FIGS. 5 and 6, the cup-shaped piston member 80 includes a lateral takeoff or outlet aperture overlap portion 130 substantially adjacent to, but spaced from, the first pressure receiving face 84. Overlap portion 130 is generally the annular surface area of piston member 80 which, in width, is substantially equal to the diameter of outlet aperture 45 and is aligned with same when the valve 17 is closed.

If the diameter of cup-shaped piston member 80, in the region of overlap portion 130, was substantially equal to the radius of the cup-shaped piston member 80 in the slide portion 115, undesirable lateral pressures would result from the movement of fluid into the slip fit between the piston member 80 and a portion 131 of the valve body 40 that is located toward an opposite side of piston member 80 from the lateral takeoff 45. That is, a net force against the piston member 80 in the general direction of arrow 142 would result.

Again, to inhibit this lateral force the instant invention includes the provision of lateral pressure relief means for the piston member 80. In the preferred embodiment, this comprises the provision of an annular recess 150 in the cup-shaped piston member 80. Generally, the annular recess 150 extends along a length of the piston member 80 from a point substantially adjacent to, but spaced apart from, the first end 100 to portion 116 of the slide portion 115. The annular recess 150 generally provides an annular pressure relief area in the valve assembly 17. In effect, space 131, in the presence of the recess 150, is sufficiently large so that no substantial laterally directed fluid pressure will build up between the valve body 40, in area 131, and the cup-shaped piston member 80. As a result, smooth operation of piston assembly along the directions of double-headed arrow 95, and generally along axis 75, will be facilitated. It will be understood that lateral relief according to certain principles of the present invention could be provided by a recess in the valve chamber portion 131, rather than in the piston member 80. Further, recesses in both could operate cooperatively to form lateral relief. The arrangement shown is preferred, in part since the resulting annular rim 102 will provide slip fitting engagement with the valve body over a greater piston member length than it would if a recess in the valve body were positioned at area 131. However, either arrangement will result in lateral pressure relief.

Generally, if the tolerance of the slip fit is on the order of several ten thousandths to several thousandths of an inch, the depth of a recess may be between about 0.02 and 0.05 inches, preferably about 0.035 inches, and be effective.

A typical cup-shaped piston member 80, for use in a fluid system having a pressure range about 250–500 psi and a flow range of about 25–50 gallons per minute, according to the present invention may be as follows:

The overall length of the piston 80 could be about 1.25–2.25 inches, with a depth of the internal bore being about 1.1–2.1 inches. The overall diameter of such a piston member should be about 0.75–1.25 inches, with the annular recess extending over a length of about 0.5–1.0 inches.

Further dimensions for a preferred cup-shaped piston member 80 are as follows:

(a) diameter of the internal bore: about 0.5–1.0 inches;
(b) distance between the center of each groove: about 0.10–0.25 inches;
(c) depth of each groove at greatest extension: between about 0.02 and 0.05 inches, and preferably about 0.035 inches.

The four grooves for such a preferred cylinder would each have side walls extending at about 90° to one another, and about 45° to the plane of the groove. The annular face 101 of such a piston member would preferably extend at an angle of between about 20–40°, and preferably about 30°, to end face 100, or at between 50–70°, and preferably about 60° with respect to longitudinal axis 75, with a preferred depth of recess in end 100 being about 0.04 inches.

It is to be understood that the above given dimensions for a piston member to be used in association with the instant invention are exemplary only, of a preferred piston member. Piston members of a variety of shapes and sizes may be made in accordance with various applications of the principles of the present invention in numerous embodiments.

For the following detailed description of the application of the preferred embodiment, reference is generally made to FIGS. 1 through 6. Referring to FIGS. 1 through 3, the head block 2 of the filter head assembly 1 is provided with a plurality of upwardly extending bolt-receiving posts 153 therein, by which the filter head assembly may be mounted into position for use. Preferably the main inlet port 7 includes a flange 154 thereon, by which the filter head assembly 1 can be connected to an inlet line. Flange 154 may be provided with bolt receiving holes, or the like, not shown, in a conventional manner. Similarly outlet port 8 may be provided with flange 155, by which it can be attached to an outlet fluid line.

Outlet port 9 is provided with flange 157 having bolt-receiving holes 158 therein, by which outlet port 9 can be attached to an auxiliary outlet line for communication with a reservoir, or with other fluid lines as desired; see schematic FIG. 8 and previous descriptions.

Referring to FIG. 3, the main inlet port 7 generally comprises an end of a channel 163 providing for inlet flow to the filter head assembly 1. The channel 163 generally terminates at annular channel 164 centered around longitudinal axis 165. Generally, the annular channel 164 includes means for flow communication with an inlet portion of filter assembly 3. For example, flow communication is shown in FIG. 3, by arrows 20, into annular channel 21 of the filter 3.

A portion 38 of the channel 164 is in direct flow communication with the valve body 40. That is, fluid need not flow through filter 3 in order to reach channel portion 38, FIGS. 4 and 5.

The head block 2 also includes inner channel 171, which for the preferred embodiment is also generally aligned with longitudinal axis 165. Preferably channel 171 is provided with means, such as a threaded member 172, to provide for attachment and fluid flow communication with filter 3. As described previously, fluid flow outwardly from filter 3, in the general direction of arrow 32, is through channel 171, and outwardly through the main outlet port 8, FIG. 3.

Referring to FIG. 5, fluid flow communication from the inlet port 7 directly to the valve internal longitudinal channel 41 is provided by means of annular space 38. Fluid flow communication to the second inlet 44, on the other hand, is provided by means of channel 176, FIG. 4.

Referring to FIG. 5, it is noted that space 38 in channel 164 widens somewhat in the vicinity of the first inlet port 43. This is, in part, to increase the cross-sectional area of the first inlet 43, in the region occupied by the valve seat 87, for responsiveness to fluid pressures. Thus, a piston member of substantial diameter may be used.

Again, in normal operation the relief valve will be closed with the piston member 42 received against the first end shoulder 87, in a sealing manner; the sealing engagement being provided by sealing means including biasing member 88. When the relief valve assembly 17 is in this orientation, fluid flow will be across filter 26 and outwardly from assembly 1 by means of the main outlet port 8.

On the other hand, should filter 26 become substantially plugged, the relief valve assembly 17 will sense a substantial differential pressure between inlet 43 and inlet 44. Above a pressure differential of a certain selected amount, substantially the biasing pressure of biasing member 88, the piston member 42 will be pushed away from the shoulder 87 permitting fluid to flow through a portion of the valve body 40 and outwardly through lateral outlet 45.

In a typical application the above-described filter head may be utilized for a filter system wherein typical fluid pressures for operation are on the order of about 250 to about 500 PSI (pounds per square inch). Preferably such a system is adapted to selectively open in response to resistance against the biasing means 88 resulting from a differential pressure on the order of about one-hundred to several hundred PSI. It will be understood, however, that the principles of the present invention may be applied to systems operating under a variety of pressures and a variety of pressure differentials.

A particular advantage to the filter head described above is that it may be die cast with the valve body already formed therein. This is facilitated by an arrangement in which the longitudinal axis 75, FIG. 5, of the valve body longitudinal channel 41 is substantially parallel to longitudinal axis 165, when longitudinal axis 165 is generally the flow axis for channels permitting flow into and out from spin-on filter 3. By having these axes generally parallel to one another, a relatively simple die-cast manufacture of the assembly is permitted, with apertures generally perpendicular to these axes being formable as by drilling or the like. That is, the longitudinal axis 41 is oriented for convenience in pulling apart a die, in which the system is case.

A useful variation in the embodiment described could be created by closing outlet aperture 9 with a cap or the like, after providing a flow channel from the valve chamber directly to outlet 8. In this manner, the valve assembly would provide a bypass, analogous to that described previously for valve 70 of FIG. 8, which under pressure would allow fluid flow to bypass the filter but otherwise continue through the system. Under such a system no special conduit would be used to engage outlet 9. Rather, the outlet 9 would be closed and internal flow directing means would direct flow outwardly through outlet 8. An advantage to the present invention is that a single type of cast filter head may be used, with minor modifications, in either this manner or the manner previously described.

FIG. 7 generally designates an alternate embodiment of the present invention. Generally, FIG. 7 only shows a valve body portion, and the remainder of the assembly may be substantially identical to that previously described. In FIG. 7, reference numeral 201 generally designates the filter head assembly having head block 202 including valve body 203. The valve body 203 may be substantially identical to that previously described, including with respect to those portions of the assembly, the biasing member and piston member, which form the internal mechanism of relief valve assembly 207. For such a system the biasing member would typically be reated in force capability then for the previously described embodiment, as the biasing member now provides for the opening pressure of the valve. That is, it must resist normal operation pressures.

The only substantial difference between the arrangement shown in FIG. 7 and that previously described is that the second inlet 208, for valve body 203, is no longer in direct flow communication with the downstream side of filter 3. Rather, former channel 176 is missing, and has been replaced by channel 209, providing flow communication with lateral outlet or takeoff aperture 210. By means of channel 209, a vent to the reservoir, or elsewhere, is provided from the valve assembly 207.

Thus, for the alternate embodiment, the relief valve assembly 207 does not directly sense a pressure differential across the filter, rather pressure from the inlet line is measured versus pressure from the spring or biasing member. It will be understood that lateral pressure relief, with respect to this embodiment, may be relatively unimportant since there may not be a substantial fluid pressure between the piston and the valve body in the slip fit.

From the previous description, it will be understood that the principles of the present invention may be utilized in relief valve assemblies other than those directly responding to differential pressures between outlet and inlet sides of the filter. Further, it will be understood that substantially identical die cast techniques may be utilized to form head blocks utilizable in either the preferred or alternate embodiments, with only a few, relatively minor, modifications. That is, for the alternate embodiment no channel 176 should be created and in its place channel 209 would be formed.

Preferably, for either the preferred or alternate embodiments, the headblock 2 will be die cast from a metal such as aluminum or the like, which can be handled by conventional techniques. The preferred piston member, on the other hand, may be substantially harder, formed from hardened steel or the like, to within very close tolerances. While a variety of materials may be used, the above-described materials generally yield a preferably operable device.

It is to be understood that while some embodiments of the present invention have been illustrated or described herein, the invention is not to be limited to specific forms or arrangements of parts herein described and shown.

WHAT IS CLAIMED AND DESIRED TO BE SECURED BY LETTERS PATENT IS AS FOLLOWS:

1. A relief valve assembly comprising:
    (a) a valve body;
        (i) said valve body defining an elongate valve chamber having a longitudinal axis and a lateral fluid takeoff aperture;
    (b) a valve piston member slideably positioned in said valve chamber for selected movement along said longitudinal axis to selectively permit substantial fluid flow communication outwardly from said valve body and through said lateral fluid takeoff aperture; and
    (c) lateral pressure relief means constructed and arranged to stabilize said valve piston member with respect to potential lateral pressures acting thereon due to a relatively low pressure at said lateral fluid takeoff aperture;
    (d) whereby a tendency for said valve piston member to deviate laterally from smooth sliding movement along said longitudinal axis, and toward said lateral fluid takeoff aperture, due to relatively low pressure at said takeoff aperture, may be substantially alleviated.

2. A relief valve assembly according to claim 1 wherein:
    (a) said valve piston member has an outer sidewall;
        (i) said outer sidewall having an outlet overlap portion sized to substantially completely overlap said outlet aperture when said valve assembly is operated to prohibit substantial flow through said fluid takeoff aperture; and,
    (b) said lateral pressure relief means includes an annular recess in at least a first of said valve piston member sidewall and said valve chamber at said takeoff aperture overlap portion;
    (c) whereby said annular recess facilitates pressure relief around said piston member and between said piston member and said valve body, at a portion of said piston member substantially overlapping said takeoff aperture, to substantially equilibrate radial forces that may act laterally on said valve piston member outer sidewall.

3. The relief valve assembly according to claim 2 wherein said annular recess is in said valve piston member sidewall.

4. A relief valve assembly comprising:
  (a) a valve body;
    (i) said valve body defining an elongate valve chamber having a longitudinal axis and first and second longitudinal spaced fluid inlets;
    (ii) said valve body further defining a lateral fluid outlet aperture substantially adjacent to, and spaced from, said first fluid inlet;
  (b) a valve piston member slidably positioned in said valve chamber for selected movement along said longitudinal axis in response to selected differential pressures between said first and second fluid inlets;
  (c) first seal means constructed and arranged to selectively seal said valve piston member against said first fluid inlet substantially preventing fluid flow therefrom and through said outlet aperture until intended; and
  (d) lateral pressure relief means constructed and arranged to stabilize said valve piston member with respect to potential lateral pressures acting thereon due to relatively low pressures at said lateral fluid outlet aperture;
  (e) whereby tendency for said valve piston member to deviate laterally from smooth sliding movement along said longitudinal axis, and toward said outlet aperture, due to relatively low pressure at said outlet aperture, may be substantially alleviated.

5. A relief valve assembly according to claim 4 wherein:
  (a) said valve piston member has a first end portion and an outer sidewall;
    (i) said valve piston member first end portion being constructed and arranged to selectively sealing seat with said valve body to close said first fluid inlet;
    (ii) said piston member outer sidewall having an outlet aperture overlap portion spaced from said piston member first end portion and sized to substantially completely overlap said outlet aperture when said piston member seats against said valve body to block said first fluid inlet; and
  (b) said lateral pressure relief means includes an annular recess in at least a first of said valve chamber and said valve piston member sidewall at said outlet aperture overlap portion;
  (c) whereby said annular recess facilitates pressure relief substantially completely around said piston member and between said piston member and said valve body, at a portion of said piston member substantially overlapping said outlet aperture, to substantially equilibrate radial forces acating laterally on said valve piston member outer sidewall.

6. The relief valve assembly according to claim 5 wherein said annular recess is in said piston member 7. A relief valve assembly according to claim 6 wherein:
  (a) said annular recess is between about 0.02 and 0.05 inches deep.

8. A relief valve according to claim 6 including:
  (a) an annular rim portion forming an outer edge seal on said valve piston member first end portion;
    (i) said annular rim portion including an angular pressure face and a substantially sharply tipped sealing edge;
    (ii) said sharply tipped sealing edge forming a piston member seat adapted to selectively sealingly seal with said valve body to close said first fluid inlet; and
    (iii) said annular rim portion being oriented to form a recessed portion in said piston member first end;
  (b) whereby said annular rim portion in cooperation with a remaining area of said piston member first end forms a surface including an angular portion, for receiving fluid pressure at said fluid inlet.

9. A relief valve assembly according to claim 12 wherein:
  (a) said annular rim portion angular pressure face extends at an angle of between about 50-70° with respect to said longitudinal axis.

10. A relief valve assembly comprising:
  (a) a valve body;
    (i) said valve body defining an elongate valve chamber having a longitudinal axis and first and second longitudinally spaced fluid inlets;
    (ii) said valve body further defining a lateral fluid outlet aperture substantially adjacent to, and spaced from, said first fluid inlet;
  (b) a valve piston member slidably positioned in said valve chamber for selected movement along said longitudinal axis in response to selected differential pressures between said first and second fluid inlets;
    (i) said valve piston member being cup-shaped and having: an inner bore; a first end portion; a second open end; and, an outer sidewall;
    (ii) said valve piston member first end portion being adapted to selectively sealingly seat with said valve body to close said first fluid inlet;
    (iii) said piston member outer sidewall having an outlet aperture overlap portion spaced from said piston member first end portion and sized to substantially completely overlap said outlet aperture when said piston member seats against said valve body to block said first fluid inlet;
  (c) first seal means constructed and arranged to selectively seal said valve piston member against said first fluid inlet to prevent fluid flow therefrom and through said outlet aperture until intended;
    (i) said first seal means including a biasing member engaging said piston member inner bore;
  (d) lateral pressure relief means constructed and arranged to stabilize said valve piston with respect to potential lateral pressures acting thereon due to a relatively low pressure at said lateral fluid outlet aperture;
    (i) said lateral pressure relief means including an annular recess positioned in said valve piston member sidewall at said outlet aperture overlap portion;
  (e) whereby a tendency for said valve piston to deviate laterally from smooth sliding movement along said longitudinal axis, and toward said outlet aperture, due to relatively low pressure at said outlet aperture, may be substantially alleviated.

11. A filter head assembly having a relief valve therein for use in cooperative engagement with a fluid filter; said filter head assembly comprising:
  (a) a head block member having a main inlet port, a main outlet port and means for operable engagement with a fluid filter having an inlet flow channel and an outlet flow channel;
  (i) said head block having a cylindrical flow channel therein, said cylindrical flow channel being flow communication with a first of said main outlet port and main inlet port and including conduit means for fluid flow communication with a corresponding one of inlet and outlet flow channels of an associated fluid filter; said cylindrical flow channel having a first longitudinal axis;
  (ii) said head block having an annular flow channel therein, said annular flow channel generally surrounding said cylindrical flow channel and being spaced therefrom; said annular flow channel being disposed about a longitudinal axis substantially coaxial with said cylindrical flow channel longitudinal axis; said annular flow channel being in flow communication with a second of said main inlet port and main outlet port and including conduit means for directing fluid flow communication with a corresponding one of the inlet and outlet flow channels of an associated fluid filter;
(b) a valve body formed in said head block member;
  (i) said valve body defining an elongate valve chamber having a longitudinal axis generally parallel with said cylindrical flow channel longitudinal axis; and, said valve body valve chamber having first and second longitudinally spaced inlets; said first fluid inlet being in flow communication with said main fluid inlet, without requiring flow through an associated filter;
  (ii) said valve body further defining a lateral fluid takeoff aperture substantially adjacent to, and spaced from, said first valve body inlet;
(c) a valve piston member slidably positioned in said valve chamber for selected movement along said valve chamber longitudinal axis in response to selected pressure from said first valve body inlet; and
(d) first seal means adapted to selectively seal said valve piston member against said valve body first inlet, substantially preventing fluid flow therefrom and through said takeoff aperture until intended;
(e) whereby said head block member may be die cast with said cylindrical flow channel, said annular flow channel and said valve body valve chamber substantially formed therein.

12. A filter head assembly having a relief valve therein for use in cooperative engagement with a fluid filter; said filter head assembly comprising:
(a) a head block member having a main inlet port, a main outlet port and means for operable engagement with a fluid filter having an inlet flow channel and an outlet flow channel;
  (i) said head block having a cylindrical flow channel therein, said cylindrical flow channel being in flow communication with a first of said main outlet port and main inlet port and including conduit means for fluid flow communication with a corresponding one of inlet and outlet flow channels of an associated fluid filter; said cylindrical flow channel having a first longitudinal axis;
  (ii) said head block having an annular flow channel therein, said annular flow channel generally surrounding said cylindrical flow channel and being spaced therefrom; said annular flow channel being disposed about a longitudinal axis substantially coaxial with said cylindrical flow channel longitudinal axis; said annular flow channel being in flow communication with a second of said main inlet port and main outlet port and including conduit means for directing fluid flow communication with a corresponding one of the inlet and outlet flow channels of an associated fluid filter;
(b) a valve body formed in said head block member;
  (i) said valve body defining an elongate valve chamber having a longitudinal axis generally parallel with said cylindrical flow channel longitudinal axis; and, said valve body valve chamber having first and second longitudinally spaced fluid inlets; said first fluid inlet being in flow communication with said main fluid inlet, without requiring flow through an associated filter; and, said second fluid inlet being in flow communication with an outlet side of an associated fluid filter;
  (ii) said valve body further defining a lateral fluid takeoff aperture substantially adjacent to, and spaced from, said first valve body inlet;
(c) a valve piston member slidably positioned in said valve chamber for selected movement along said valve chamber longitudinal axis in response to selected differential pressures between said first and second valve body fluid inlet;
(d) first seal means adapted to selectively seal said valve piston member against said valve body first fluid inlet, substantially preventing fluid flow therefrom and through said takeoff aperture until intended; and;
(e) lateral pressure relief means adapted to stabilize said valve piston with respect to potential lateral fores acting thereon due to relatively low pressures at said lateral fluid takeoff aperture;
(f) whereby said head block member may be die cast with said cylindrical flow channel, said annular flow channel and said valve body valve chamber substantially formed therein; and
(g) whereby a tendency for said valve piston member to deviate laterally from smooth sliding movement along said longitudinal axis, and toward said takeoff aperture, due to relatively low pressure at said lateral takeoff aperture may be substantially alleviated.

13. A filter head assembly having a relief valve therein for use in cooperative engagement with a fluid filter; said filter head assembly comprising:
(a) a head block member having a main inlet port, a main outlet port and means for operable engagement with a fluid filter having an inlet flow channel and an outlet flow channel;
  (i) said head block having a cylindrical flow channel therein, said cylindrical flow channel being in flow communication with said main outlet port and including conduit means for receipt of fluid force from an outlet flow channel of an engaged fluid filter; said cylindrical flow channel having a first longitudinal axis;
  (ii) said head block having an annular flow channel therein, said annular flow channel generally surrounding said cylindrical flow channel and being spaced therefrom; said annular flow channel being disposed about a longitudinal axis substantially coaxial with said cylindrical flow channel longitudinal axis; said annular flow channel being in flow communication with said main inlet port and including conduit means for directing fluid flow into an inlet flow channel of an engaged filter;
    (b) a valve body formed in said head block member;
        (i) said valve body defining an elongate valve chamber having a longitudinal axis generally parallel to said cylindrical flow channel longitudinal axis; and, said valve body valve chamber having first and second longitudinally spaced inlets, said first inlet being in flow communication with said annular flow channel;
        (ii) said valve body further defining a lateral fluid takeoff aperture substantially adjacent to and spaced from, said first fluid inlet; said lateral takeoff aperture being in flow communication with said second inlet;
    (c) a valve piston member slidably positioned in said valve chamber for selected movement along said valve chamber longitudinal axis in response to selected differential pressures between said first and second valve body inlets; and
    (d) first seal means constructed and arranged to selectively seal said valve piston member against said valve body first fluid inlet, substantially preventing fluid flow therefrom and through said takeoff aperture until intended;
    (e) whereby said head block member may be die cast with said cylindrical flow channel, said annular flow channel and said valve body valve chamber substantially formed therein.

14. A cylindrical valve piston member for slidable use in a valve body longitudinal channel having first and second, spaced, fluid inlets, a longitudinal axis and a lateral fluid flow takeoff aperture; said valve piston member comprising:
    (a) a cylindrical member having a first pressure-receiving end and an outer cylindrical sidewall;
        (i) said first pressure-receiving end being constructed and arranged to selectively sealingly seat with the first fluid inlet in the valve body;
        (ii) said outer cylindrical sidewall of said piston member having an outlet aperture portion spaced from said first pressure-receiving end and sized to substantially completely overlap the lateral takeoff aperture when said piston member seats against the valve body to block the first fluid inlet; said takeoff aperture overlap portion including an annular recess therein;
    (b) whereby said annular recess facilitates pressure relief substantially completely around said piston member and between said piston member and the valve body, in a portion of said piston member substantially overlapping the outlet aperture, to substantially equilibrate radial forces that may act laterally on said piston member outer sidewall.

15. A valve piston member according to claim 14 wherein:
    (a) said annular recess is between about 0.02 and 0.05 inches deep.

16. A piston member according to claim 14 including:
    (a) an annular rim portion forming an outer edge seal on said valve piston member first end;
        (i) said annular rim portion including an angular pressure face and a substantially sharply tipped sealing edge;
        (ii) said sharply tipped sealing edge forming a piston member seat constructed and arranged to selectively sealingly seat with said valve body to close said first fluid inlet; and
        (iii) said annular rim portion being oriented to form a recessed portion in said piston member first end;
    (b) whereby said annular rim portion in cooperation with a remaining area of said piston member first end forms a surface including an angular portion, for receiving fluid pressure at said fluid inlet.

17. A relief valve assembly comprising:
    (a) a valve body;
        (i) said valve body defining an elongate valve chamber having a longitudinal axis and a first fluid inlet;
        (ii) said valve body further defining a lateral fluid outlet aperture substantially adjacent to, and spaced from, said first fluid inlet;
    (b) a valve piston member slidably positioned in said valve chamber for selected movement along said longitudinal axis in response to selected pressures from said first fluid inlet;
        (i) said piston member having a first end portion constructed and arranged to selectively sealingly seat with a shoulder in said valve body around said first fluid inlet to close said first fluid inlet;
        (ii) said first end portion including an outwardly extending annular rim portion forming an outer edge seal on said valve piston member first end portion; said annular rim portion including an angular pressure face and a substantially sharply tipped sealing edge; said annular rim portion angular rim portion generally extending toward said valve body shoulder;
    (c) biasing means selectively biasing said piston member against said first fluid inlet until a selected opening pressure for said relief valve is achieved;
    (d) whereby an effective diameter for said piston member first end, to receive pressure thereagainst from said first inlet, is greater than a diameter of said first inlet.

* * * * *

UNITED STATES PATENT AND TRADEMARK OFFICE
CERTIFICATE OF CORRECTION

PATENT NO. : 4,883,083

DATED : November 28, 1989

INVENTOR(S) : Jack Stifelman, John F. Connelly and Jeff J. Theisen

It is certified that error appears in the above-identified patent and that said Letters Patent is hereby corrected as shown below:

Front Page, Inventors
  Replace existing list of inventors with:
  --Jack Stifelman, of Bloomington; John F. Connelly, Minnetonka, Jeff J. Theisen, Prior Lake, all of Minn.--

Abstract, Line 2
  Replace "in" with --with--

Abstract, Line 8
  Replace "with" with --without--

Column 5, Line 30
  Delete both commas after "cylindrical"

Column 15, Line 20
  Replace "case" with --cast--

Column 15, Line 48
  Replace "reated" with --rated--

Column 17, Line 57
  Replace "acating" with --acting--

Column 18, Line 15
  Replace "12" with --8--

Column 19, Line 5
  Insert --in-- before "flow"

UNITED STATES PATENT AND TRADEMARK OFFICE
CERTIFICATE OF CORRECTION

PATENT NO. : 4,883,083

DATED : November 28, 1989

INVENTOR(S) : Jack Stifelman, John F. Connelly and Jeff J. Theisen

It is certified that error appears in the above-identified patent and that said Letters Patent is hereby corrected as shown below:

Column 20, Line 38
    Replace "fores" with --forces--

Signed and Sealed this

Thirteenth Day of November, 1990

Attest:

HARRY F. MANBECK, JR.

*Attesting Officer*

*Commissioner of Patents and Trademarks*